United States Patent
Smith et al.

(10) Patent No.: US 9,888,028 B2
(45) Date of Patent: Feb. 6, 2018

(54) COMBINATION OF REMOTE TRIGGERED SOURCE AND DESTINATION BLACKHOLE FILTERING

(71) Applicant: CenturyLink Intellectual Property LLC, Denver, CO (US)

(72) Inventors: Donald J. Smith, Denver, CO (US); John A. Schiel, Littleton, CO (US)

(73) Assignee: CenturyLink Intellectual Property LLC, Denver, CO (US)

(*) Notice: Subject to any disclaimer, the term of this patent is extended or adjusted under 35 U.S.C. 154(b) by 287 days.

(21) Appl. No.: 14/267,226

(22) Filed: May 1, 2014

(65) Prior Publication Data
US 2014/0331308 A1   Nov. 6, 2014

Related U.S. Application Data (60) Provisional application No. 61/819,412, filed on May 3, 2013.

(51) Int. Cl.
*G06F 15/16* (2006.01)
*H04L 29/06* (2006.01)

(52) U.S. Cl.
CPC ...... *H04L 63/1441* (2013.01); *H04L 63/0236* (2013.01); *H04L 63/1458* (2013.01); *H04L 63/0272* (2013.01)

(58) Field of Classification Search
CPC ............. H04L 63/1441; H04L 63/1548; H04L 63/0236; H04L 63/0272
See application file for complete search history.

(56) References Cited

U.S. PATENT DOCUMENTS

| | | | | |
|---|---|---|---|---|
| 7,185,107 B1* | 2/2007 | Cassar | ............... | H04L 29/12933 370/346 |
| 7,215,637 B1* | 5/2007 | Ferguson | ................ | H04L 45/00 370/230.1 |
| 7,409,712 B1* | 8/2008 | Brooks | ............... | H04L 63/1458 713/188 |
| 7,590,245 B1* | 9/2009 | Levitan | ................... | H04L 45/00 380/255 |
| 7,668,949 B1* | 2/2010 | Allan | ................... | H04L 41/0873 709/220 |
| 7,688,727 B1* | 3/2010 | Ferguson | ............ | H04L 49/3009 370/230.1 |

(Continued)

*Primary Examiner* — Khoi Le
(74) *Attorney, Agent, or Firm* — Swanson & Bratschun, L.L.C.

(57) ABSTRACT

A method for remote triggered black hole filtering can include advertising a first modified next hop address for a destination address of network traffic, and advertising a second modified next hop address for a source address of network traffic. The first next hop address of the destination address might be overwritten with the first modified next hop address. Filtered traffic then can be forwarded to the first modified next hop address, wherein filtered traffic comprises only network traffic addressed to the destination address or from the source address. In some cases, the filtered traffic is transported and received via a sinkhole tunnel. A second next hop address of the source address can be overwritten to a second modified next hop address. The attack traffic, which can be filtered traffic that is both addressed to the destination address and from the source address, might be forwarded to a discard interface.

15 Claims, 6 Drawing Sheets

(56) References Cited

U.S. PATENT DOCUMENTS

| | | | |
|---|---|---|---|
| 7,873,993 B2 * | 1/2011 | King | H04L 63/0263 726/1 |
| 2004/0039840 A1 * | 2/2004 | Dispensa | H04L 45/02 709/242 |
| 2004/0148520 A1 * | 7/2004 | Talpade | H04L 63/1458 726/22 |
| 2008/0127338 A1 * | 5/2008 | Cho | G06F 21/566 726/22 |
| 2009/0288157 A1 * | 11/2009 | Pacella | H04L 63/1441 726/12 |
| 2010/0034204 A1 * | 2/2010 | Sakauchi | H04L 12/437 370/400 |
| 2010/0058442 A1 * | 3/2010 | Costa | H04L 63/20 726/3 |
| 2011/0153801 A1 * | 6/2011 | Ji | H04L 41/12 709/224 |
| 2013/0044758 A1 * | 2/2013 | Nguyen | H04L 45/306 370/401 |
| 2013/0275587 A1 * | 10/2013 | Smith | H04L 47/125 709/224 |
| 2015/0256401 A1 * | 9/2015 | Zinger | H04L 41/14 370/401 |

* cited by examiner

COMBINATION OF REMOTE TRIGGERED SOURCE AND DESTINATION BLACKHOLE FILTERING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to telecommunications networking, and more particularly, to techniques for implementing combined source and destination blackhole filtering to respond to denial of service (DoS) attacks.

BACKGROUND

Distributed denial of service (DDoS) attacks present security and availability issues for many organizations, and in particular, for enterprises engaged in content delivery services. In a DDOS attack, many distributed hosts flood a target system with traffic, such as HTTP requests directed at a web server under attack. The flood of traffic overloads the server so that the system under attack cannot respond to legitimate traffic in an effective manner. Such attacks, and the resultant unavailability, can produce several adverse consequences for the operator of the server, including loss of reputation, potential loss of business or revenue, and substantial bandwidth costs.

A conventional technique for responding to DDoS attacks is to use customer-triggered real-time black holes, otherwise known as remote triggered destination internet protocol (IP) address black hole filtering (RTDBHF). Black hole filtering (BHF) results in packets being forwarded to a router's bit bucket (e.g. Null 0/discard interface/null interface). Traditionally, RTDBHF works solely based on the destination address of the traffic by exploiting the forwarding logic of routers. All traffic to the attacked DNS or IP address is sent to the null interface. RTDBHF allows destination IP address black holes to be triggered remotely, by customers, or an internet service provider. A user can remotely trigger a destination address network-wide black hole filtering response using border gateway protocol (BGP) and static routes pointing to the null interface. Thus, although RTDBHF discards attack traffic directed towards the destination and mitigates collateral damage to other systems and network availability, the targeted system is taken completely offline as both legitimate traffic and attack traffic to the destination address are discarded.

Destination IP address enhanced BGP-triggered black holing techniques, also known as remote triggered destination enhanced black hole filtering (RTDEBHF) have been developed that address this concern. RTDEBHF techniques uniquely identify autonomous system (AS) border routers that could direct attack traffic to the targeted system. BGP community values are also assigned to identify sets of the border routers. By using a customized internal BGP (iBGP) advertisement containing the address of the targeted network and BHP community value, only the next hops of the selected routers are changed to the null interface, and the original next hop addresses to the targeted network on all other routers are preserved. Thus, traffic is filtered only from the routers identified as routers that could direct attack traffic and having specific route map matches for the BGP community value, while all other traffic will get forwarded to the targeted network.

An alternative conventional technique for handling DDoS attacks is to use remote triggered black hole filtering with Unicast Reverse Path Forwarding (uRPF), also known as remote triggered IP address source black hole filtering (RTSBHF). RTSBHF is a technique that allows black hole filtering based on the source address of the network traffic. uRPF techniques are combined with remotely triggered black hole filtering so that BGP can be used to distribute discard routes directed to the null interface, based on the source address of the attack traffic. This results in all traffic to and from a source address to be dropped.

Up until now combining RTDBHF with RTSBHF has not been considered feasible. Thus, there is a need for more robust solutions to provide the combined benefits of RTDBHF and RTSBHF.

BRIEF SUMMARY

Embodiments provide tools and techniques for combination remote triggered source and destination black hole filtering.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, a method in accordance with one set of embodiments comprises advertising a first modified next hop address for a destination address of network traffic, and advertising a second modified next hop address for a source address of network traffic. In some embodiments, a first next hop address of the destination address is overwritten with the first modified next hop address and filtered traffic is forwarded to the first modified next hop address, wherein filtered traffic comprises only network traffic addressed to the destination address or from the source address. The filtered traffic might be transported and received via a sinkhole tunnel. A second next hop address of the source address then can be overwritten with a second modified next hop address, and attack traffic might be forwarded to a discard interface. In an aspect, attack traffic can be filtered traffic that is both addressed to the destination address and from the source address.

A device for remote triggered combined destination and source IP address black hole filtering in accordance with a set of embodiments might comprise a remote triggered destination address black hole filter unit, and a remote triggered source address black hole filter unit. The remote triggered destination address black hole filter unit might comprise one or more processors, a first route information listing, wherein the route information listing includes a routing table or forwarding information base, and a non-transitory computer readable medium containing machine-readable instructions. The machine-readable instructions when read by the one or more processors, causes the one or more processors to receive an advertisement having a first modified next hop address for a destination address of network traffic, overwrite a first next hop address of the destination address with the first modified next hop address in the first route information listing, forward filtered traffic to the first modified next hop address, wherein filtered traffic comprises only network traffic addressed to the destination address or from the source address, transport the filtered traffic via a sinkhole tunnel, receive the filtered traffic from the sinkhole tunnel, and forward attack traffic to a discard interface, wherein attack traffic is filtered traffic that is both addressed to the destination address and from the source address. The remote triggered source address black hole filter unit comprises one or more processors, a second route information listing, wherein the second route information listing includes a routing table or forwarding information base, and non-transitory computer readable medium containing machine-readable instructions. The machine-readable instructions, when read by the one or more processors, causes the one or more processors to receive an advertisement having a second modified next hop address for a source address of network traffic, overwrite a second next hop address of the source address with the second modified next hop address in the second route information listing, forward filtered traffic to the second modified next hop address, wherein filtered traffic comprises only network traffic addressed to the destination address or from the source address, transport the filtered traffic via a sinkhole tunnel, receive the filtered traffic from the sinkhole tunnel, and forward attack traffic to a discard interface, wherein attack traffic is filtered traffic that is both addressed to the destination address and from the source address.

A system for combined remote triggered destination and source IP address black hole filtering, in accordance with another set of embodiments, comprises a core network in communication with an external network, and a subnetwork. The core network comprises an internal border gateway protocol router, the internal border gateway protocol router configured to generate a customized internal border gateway protocol advertisement, wherein the advertisement includes a first modified next hop address for a destination address of network traffic, and a second modified next hop address for a source address of network traffic.

The system can also comprise a first set of one or more remote triggered destination address black hole filtering (RTDBHF) router configured to receive an advertisement having a first modified next hop address for a destination address of network traffic, overwrite a first next hop address of the destination address with the first modified next hop address in a first route information listing, wherein the first route information listing includes a routing table or forwarding information base, forward filtered traffic to the first modified next hop address, wherein filtered traffic comprises only network traffic addressed to the destination address or from the source address, transport the filtered traffic via a sinkhole tunnel, receive the filtered traffic from the sinkhole tunnel, and forward attack traffic to a discard interface, wherein attack traffic is filtered traffic that is both addressed to the destination address and from the source address.

The system might further comprise a second set of one or more remote triggered source address black hole filtering (RTSBHF) router configured to receive an advertisement having a second modified next hop address for a source address of network traffic overwriting a second next hop address of the source address with the second modified next hop address in a second route information listing, wherein the second route information listing includes a routing table or forwarding information base, forward filtered traffic to the second modified next hop address, wherein filtered traffic comprises only network traffic addressed to the destination address or from the source address, transport the filtered traffic via a sinkhole tunnel, receive the filtered traffic from the sinkhole tunnel, and forward attack traffic to a discard interface, wherein attack traffic is filtered traffic that is both addressed to the destination address and from the source address, wherein the sinkhole tunnel is configured to communicatively couple one or more RTDBHF routers of the first set to a respective one or more RTSBHF routers of the second set.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of ordinary skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment, as other embodiments may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In one aspect, certain embodiments provide a system and/or method for redirecting network traffic destined to a target address using RTDBHF. The network uses RTDBHF techniques to direct the network traffic into a sinkhole tunnel. The sinkhole tunnel terminates on a router using RTSBHF. Thus, by using different communities on the Border Gateway Protocol (BGP) announcement, both RTDBHF and RTDBSF techniques can be combined. The sinkhole tunnel could be a Multi-Protocol Label Switching (MPLS) tunnel with Virtual Private Network (VPN) routing and forwarding (VRF or VRFS), or generic routing encapsulation (GRE) tunnels or nearly any tunnel that would encapsulate the traffic preventing routing loops.

Different embodiments can include a number of variations. Merely by way of example, the disclosed technique could be implemented on a single router using virtual routers. For instance, with a single router using virtual routers, one virtual router might use RTDBHF to direct traffic into a virtual tunnel, and a second virtual router might use RTSBHF, and in so doing might combine the two different types of filtering.

Alternatively and/or additionally, some embodiments could allow a customer (e.g., a subscriber of an ISP) to trigger filtering. In such embodiments, for example, one of the customer's routers might be configured to use RTDBHF to direct traffic into a tunnel that terminates on another router, which might use RTSBHF, thereby combining the two different types of filtering. In some cases, one or both of these routers might be at the ISP (e.g., a router using RTDBHF).

In some embodiments, different BGP communities may be defined by either the service provider or the customer to assign the different types of filtering to be performed by different elements and/or routers. For example, customer edge or provider edge routers might be assigned one type of filtering (one of RTDBHF, RTDEBHF, or RTSBHF), while a different router might be assigned another type of filtering (another of RTDBHF, RTDEBHF, or RTSBHF). Definitions of the different BGP communities might be geography or position or location-based (e.g., utilizing geographic routing techniques or the like).

Although some of the embodiments above are described with RTDBHF being performed first, followed by RTSBHF, any one of RTDBHF, RTDEBHF, or RTSBHF may be performed first, followed by another of RTDBHF, RTDEBHF, or RTSBHF.

Figure 1:
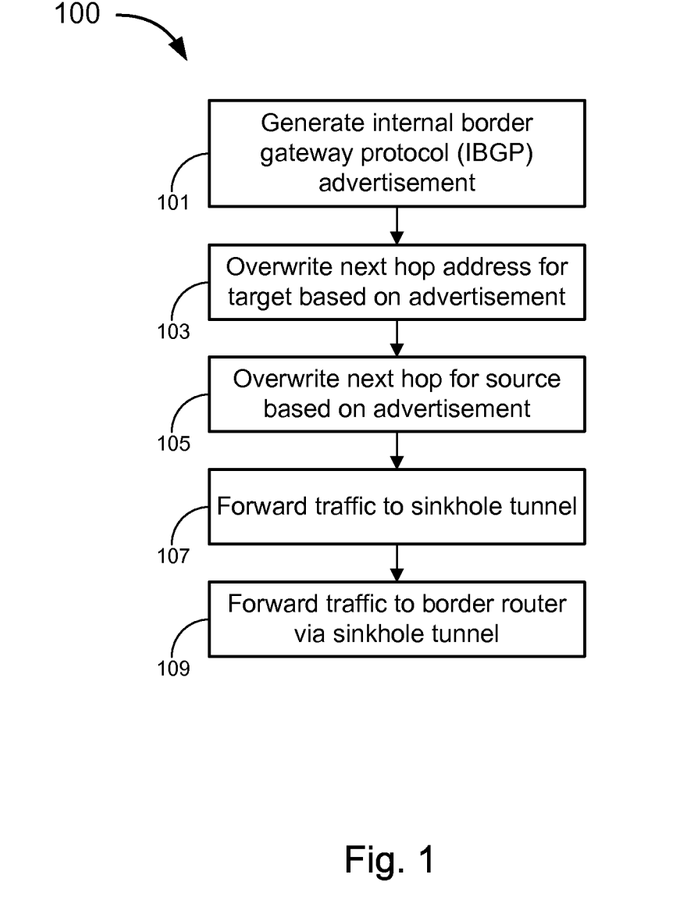
FIG. 1 is a block diagram illustrating a method of combined source and destination black hole filtering, in accordance with various embodiments.

FIG. 1 is a block diagram illustrating an example method 100 that can be used in accordance with one set of embodiments for combined destination and source address black hole filtering. While the techniques and procedures of the method 100 are depicted and/or described in a certain order for purposes of illustration, it should be appreciated that certain procedures may be reordered and/or omitted within the scope of various embodiments. Moreover, while the method illustrated by FIG. 1 can be implemented by (and, in some cases, is described below with respect to) systems 300 of FIG. 3 (or components thereof), and system 400 of FIG. 4, the method may also be implemented using any suitable hardware implementation. Similarly, while systems 300 and 400 (and/or components thereof) can operate according to the method illustrated by FIG. 1 (e.g., by executing instructions embodied on a computer readable medium), systems 300 and 400 can also operate according to other modes of operation and/or perform other suitable procedures.

At block 101, an iBGP advertisement is generated. Any suitable technique can be used to generate an iBGP advertisement. In some embodiments, the iBGP advertisement is generated by an iBGP router participating in the autonomous system of the attacked network and in communication with each border router in the network. The iBGP advertisement modifies the next hop address for the targeted network or host. In one embodiment, the next hop address for the targeted network or host is replaced with a modified next hop address that is the address of a sinkhole tunnel. In other embodiments, the next hop address for the targeted network or host is replaced with a modified next hop address that is the address of a discard interface. The iBGP advertisement also announces a source address or network that needs to be blocked using BGP tagged with a community. This causes the next hop address for the routes tagged with the community to be modified. In one embodiment, the next hop address for the source address or network is modified to the sinkhole tunnel. In other embodiments, the next hop address for the source address or network is modified to the null interface. In some embodiments, the iBGP advertisement can be triggered remotely. This can be by a subscriber, customer, or the internet service provider (ISP).

At block 103, a next hop address for a target host or network is overwritten based on the iBGP advertisement. In one embodiment, this is accomplished at the BGP border routers of a network. BGP border routers are configured as RTDBHF routers. By modifying the next hop address at the BGP border routers of a network all incoming traffic, at the edges of the network and directed to the target host or network, or multiple hosts or networks, is forwarded to the modified next hop address. In some embodiments, the next hop address is the address of a sinkhole tunnel.

At block 105, a next hop address for a source address or network is overwritten based on the iBGP advertisement. In one embodiment, this is accomplished at a BGP border router of a network. BGP border routers are configured as RTSBHF routers. By modifying the next hop address of the source address or network, all incoming traffic originating from a selected source address, network, or multiple addresses or networks, are forwarded to the modified next hop address. In some embodiments, the next hop address is a static route to a discard interface.

At block 107, network traffic is forwarded to a sinkhole tunnel. In one embodiment, all traffic directed to a target host or network is forwarded by an RTDBHF router to a sinkhole tunnel. In other embodiments, all traffic originating from a source address or network is forwarded by an RTSBHF router to a sinkhole tunnel.

At block 109, the network traffic is forwarded to a border router via the sinkhole tunnel. In one embodiment, all network traffic carried by the sinkhole tunnel is directed to a target host or network. The sinkhole tunnel carries the network traffic to an RTSBHF router. The RTSBHF router receives the network traffic and forwards all network traffic originating from a source address or network to a discard interface as configured at block 105. In other embodiments, all network traffic carried by the sinkhole tunnel originates from a source address or network. The sinkhole tunnel carries the network traffic to an RTDBHF router. The RTDBHF router receives the network traffic and forwards all network traffic directed to a target host or network to a discard interface as configured at block 107. In some embodiments, the sinkhole tunnel is a multiprotocol label switching (MPLS) traffic engineering tunnel created by the routers. The routers may be virtual routing and forwarding (VRF) routers. In other embodiments, the sinkhole tunnel is a generic encapsulation tunnel. It will be appreciated by one having ordinary skill in the art that the above examples are provided merely by way of example and that other tunnels that encapsulate the traffic and prevent routing loops may be used.

Figure 2:
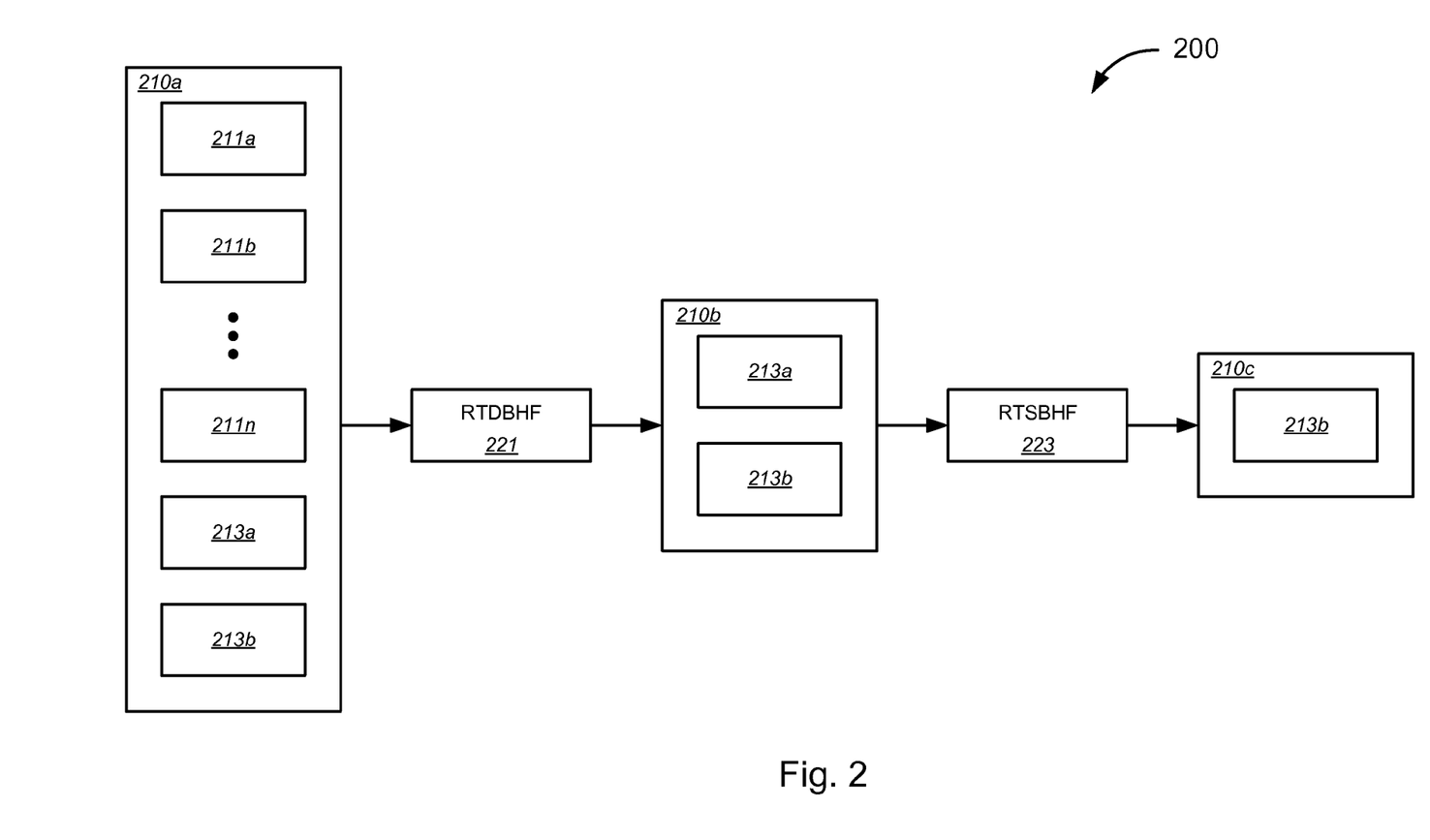
FIG. 2 illustrates network traffic flow through a destination address black hole filter and source address black hole filter, in accordance with various embodiments.

FIG. 2 provides a block diagram illustrating network traffic flow 200 through a destination address black hole filter and source address black hole filter. It should be noted that FIG. 2 illustrates only an example embodiment where the network traffic 210a flows through an RTDBHF 221 router and a subsequent RTSBHF 223 router. It will by those skilled in the art that other arrangements may be utilized in other embodiments. For example, in other embodiments, the network traffic can be forwarded by an RTSBHF router to an RTDBHF router.

Network traffic 210a is received by RTDBHF router 221. Advertisements from iBGP router have been received by RTDBHF router 221 and RTSBHF router 223, and next hop addresses updated in their respective routing tables accordingly. Network traffic 210a comprises data packets 211a-211n not directed to a target host or network. Data packets 211a-211n are treated as legitimate traffic and routed by RTDBHF router 221 to their destinations. Data packets 213a and 213b are directed to a target host or network. Thus, the next hop address for the target address of data packets 213a and 213b has been overwritten to a sinkhole tunnel. In one embodiment, the sinkhole tunnel is an MPLS tunnel. The sinkhole tunnel terminates at RTSBHF router 223. The previously received iBGP advertisement modifies the next hop address of the source address of data packet 213a to the discard interface. As a result, RTSBHF router 223 discards packet 213a for having a source address with an invalid or null/discard next hop address. Data packet 213b has a source address with a valid next hop address. Therefore, RTSBHF router 223 forwards packet 213b to the next hop address.

In the above embodiment, the RTSBHF router 223 implements source address black hole filtering by combining RTDBHF with uRPF techniques. It will be appreciated by one having ordinary skill in the art that other methods for remote triggered source address black hole filtering can be implemented as well.

Figure 3:
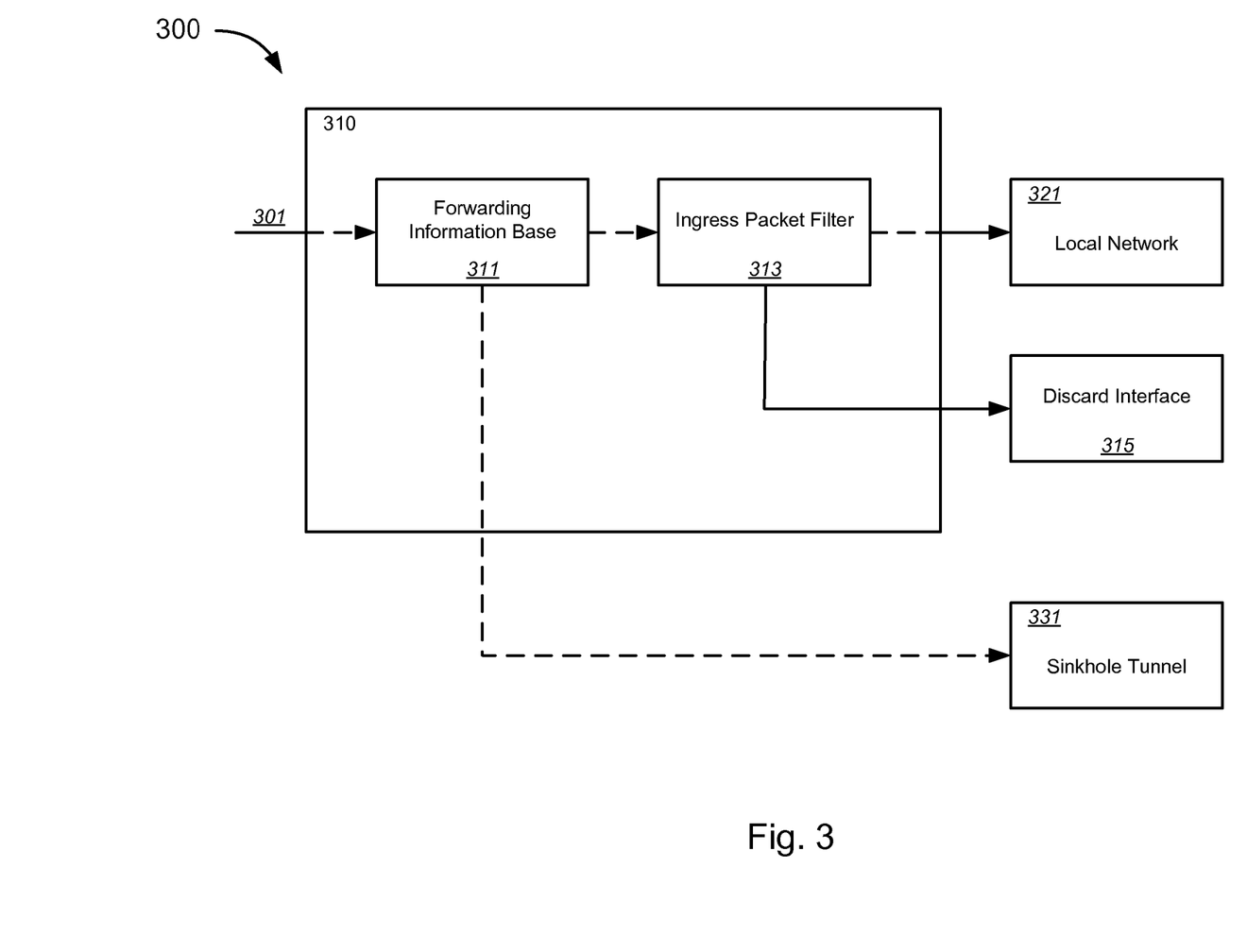
FIG. 3 illustrates a destination address black hole filtering device, in accordance with various embodiments.

FIG. 3 provides a functional block diagram 300 illustrating an example remote triggered destination address black hole filtering device 310 according to one embodiment. Incoming network traffic 301 is received by remote triggered destination address black hole filtering device 310. Destination address black hole filtering device 310 comprises forwarding information base (FIB) 311 and ingress packet filter 313. FIB 311 contains routing information for forwarding to a target address, including the address of the next device along the path to the destination address, i.e. next hop address. Network traffic 301 is then filtered by an ingress packet filter 313, or directly forwarded to sinkhole tunnel 331 according to the next hop address for the address of the network traffic 301 in the FIB 311. The ingress packet filter 313 filters the network traffic to drop packets originating from invalid source addresses. It will be appreciated by those skilled in the art that the ingress packet filter 313 can be implemented in multiple ways. In one embodiment, the ingress packet filter 313 uses reverse path filtering. Network traffic that passes through the ingress packet filter 313 is forwarded to the appropriate next hop on local network 321. If the ingress packet filter encounters an invalid address, the packet is discarded at discard interface 315.

In one embodiment, the destination address black hole filtering device 310 is an RTDBHF router. RTDBHF router 310 receives an iBGP announcement from an iBGP router. The iBGP announcement contains routing information for one or more target addresses that alters the next hop address for the one or more target addresses. RTDBHF router 310 accordingly updates the FIB 311 with new next hop addresses for the one or more target addresses to the address of sinkhole tunnel 331. Thus, all network traffic having a destination address that is a target address will be forwarded to the sinkhole tunnel 331.

Figure 4:
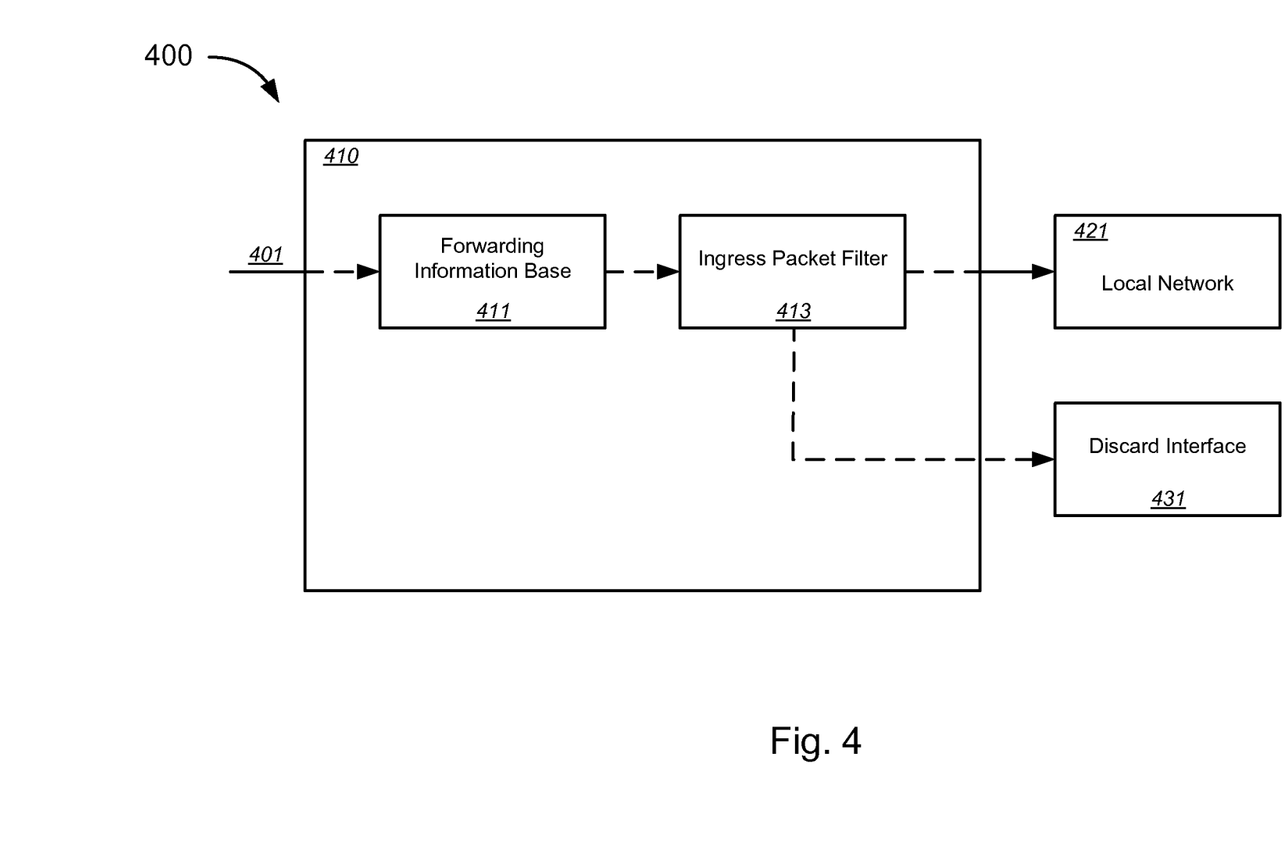
FIG. 4 illustrates a source address black hole filtering device, in accordance with various embodiments.

FIG. 4 provides a functional block diagram 400 illustrating an example remote triggered source address black hole filtering device 410. Incoming network traffic 401 is received by remote triggered source address black hole filtering device 410. In one embodiment, the incoming network traffic 401 is received via sinkhole tunnel 331 from remote triggered destination address black hole filtering device 310. Source address black hole filtering device 410 comprises forwarding information base (FIB) 411 and ingress packet filter 413. FIB 411 performs similar functions to destination address black hole filtering device FIB 311. FIB 411 contains routing information for forwarding to a target address from the source address black hole filter device 410, including a next hop address. Network traffic 401 is filtered by an ingress packet filter 413 from where the network traffic 401 is then forwarded to the appropriate destination on a local network 421, or discarded at a discard interface 431. The ingress packet filter 413 filters the network traffic to drop packets with invalid source addresses. It will be appreciated by those skilled in the art that the ingress packet filter 413 can be implemented in several ways and is not limited to the embodiments described above. Network traffic that passes through the ingress packet filter 413 is forwarded to the appropriate next hop on local network 421. If the ingress packet filter encounters an invalid address, the packet is discarded at discard interface 415.

In one embodiment, the source address black hole filtering device 410 is an RTSBHF router. RTSBHF router 410 receives an iBGP announcement from an iBGP router. The iBGP announcement contains routing information for one or more source addresses that alters the next hop address for the one or more source addresses. RTSBHF router 410 accordingly updates its FIB 411 with new next hop addresses, replacing it with the discard interface 431. Thus, all network traffic having a source address with a next hop address of the discard interface 431 will be discarded by ingress packet filter 413 as having an invalid next hop address.

Figure 5:
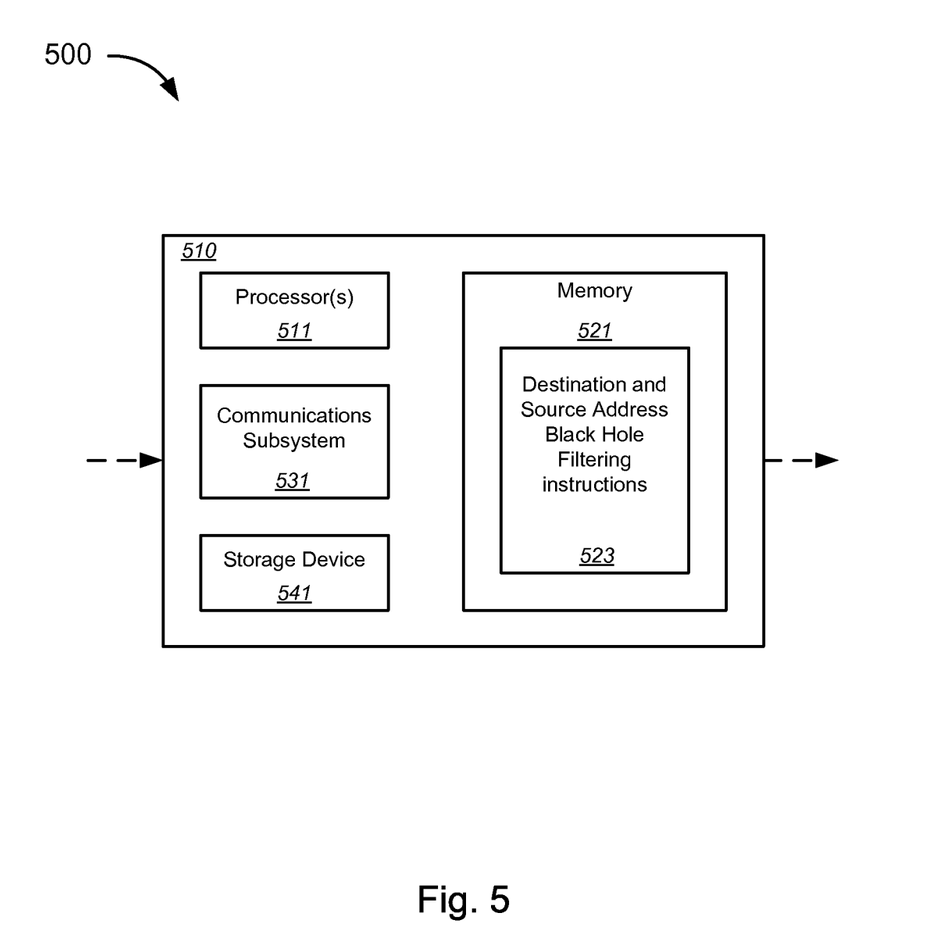
FIG. 5 illustrates a generalized hardware block diagram of a destination and source address black hole filtering device.

FIG. 5 provides a schematic illustration of one embodiment of a computer system 500 that can perform the methods provided by various other embodiments, as described herein, and/or can function as a server, router, or other network element. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer device 510 is shown comprising hardware elements that can be electrically coupled or may otherwise be in communication, as appropriate. The hardware elements include one or more processors 511, including without limitation one or more general-purpose processors and/or one or more special-purpose processors (such as digital signal processing chips, graphics acceleration processors, and/or the like), and system memory 521 which include processor readable instructions 523 for destination and/or source address black hole filtering. Optionally, in some embodiments, computer system 500 may include one or more input devices, which may include without limitation a mouse, a keyboard and/or the like; and one or more output devices, which may include without limitation a display device, a printer and/or the like.

System memory 521 and/or storage device 541 can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

In some embodiments, the computer system 500 might also include a communications subsystem 531, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 531 may permit data to be exchanged with a network (such as the network described below, to name one example), with other computer systems, and/or with any other devices described herein.

Destination and source address black hole filtering instructions 523 may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the multiple routers and methods discussed above may be implemented as software routers.

A set of these instructions and/or code might be encoded and/or stored on a non-transitory computer readable storage medium, such as system memory 521 described above. In some cases, the system memory might be incorporated within a computer system, such as the device 510. In other embodiments, the system memory 521 might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the one or more processors 511 and/or might take the form of source and/or installable code, which, upon compilation and/or installation on the computer device 510 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 511 executing one or more sequences of one or more instructions 523 contained in system memory 521. Such instructions 523 may be read into the working system memory 521 from another computer readable medium, such as one or more of the storage device(s) 541. Merely by way of example, execution of the sequences of instructions 523 contained in the system memory 521 might cause the processor(s) 511 to perform one or more procedures of the methods described herein.

The terms "machine readable medium" and "computer readable medium," as used herein, refer to any medium that participates in providing data that causes a machine to operation in a specific fashion. In an embodiment implemented using the computer system 500, various computer readable media might be involved in providing instructions/code to processor(s) 511 for execution and/or might be used to store and/or carry such instructions/code. In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device 541. Volatile media includes, without limitation, dynamic memory, which can also be part of storage device 541 or system memory 521. Transmission media includes, without limitation, coaxial cables, copper wire and fiber optics, including the wires that comprise the bus, as well as the various components of the communication subsystem 531 (and/or the media by which the communications subsystem 531 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 511 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments.

The communications subsystem 531 (and/or components thereof) generally will receive the signals, and a bus then might carry the signals (and/or the data, instructions, etc. carried by the signals) to the system memory 521, from which the processor(s) 511 retrieves and executes the instructions. The instructions received by the system memory 521 may optionally be stored on a storage device 541 either before or after execution by the processor(s) 511.

Figure 6:
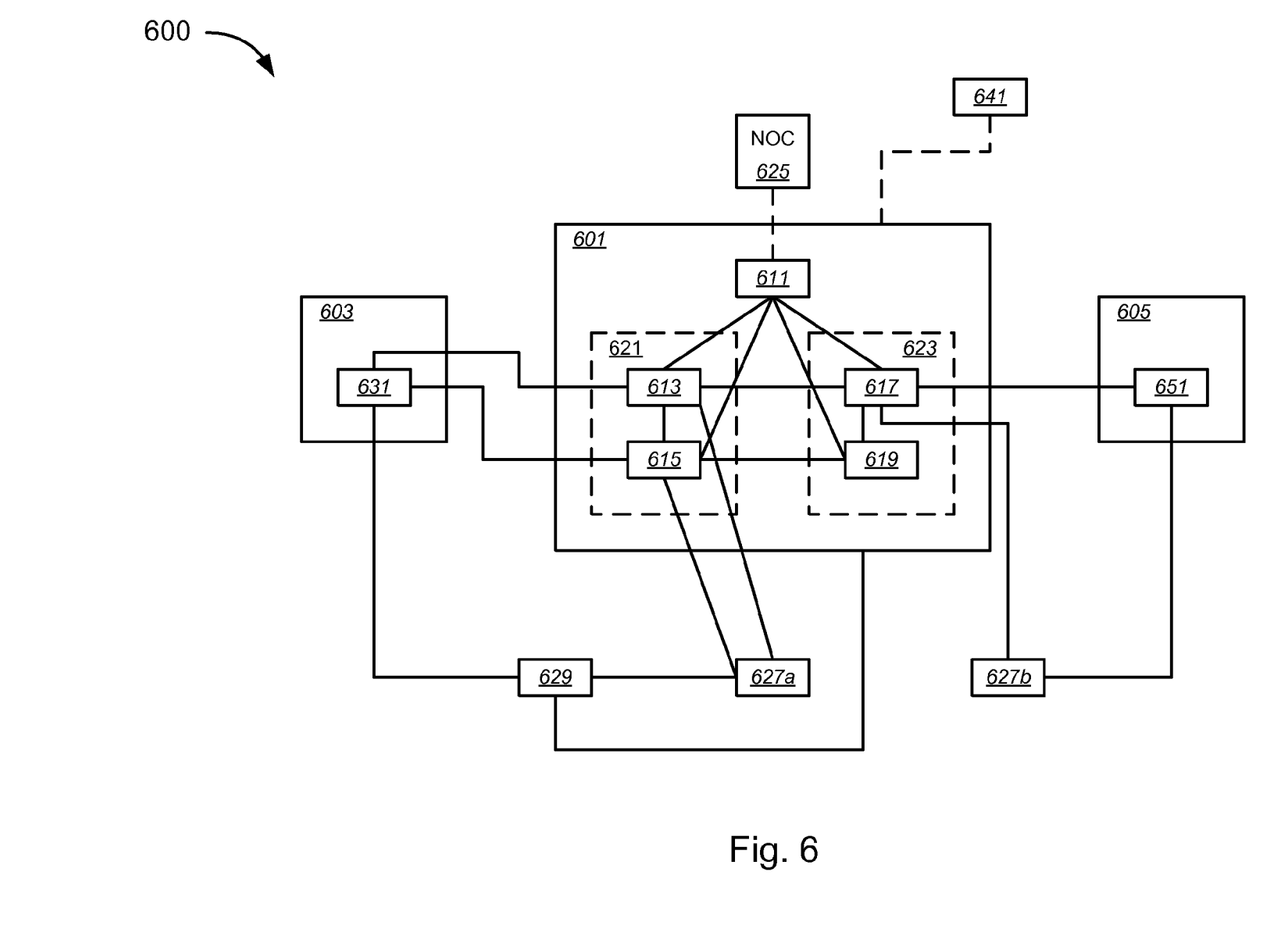
FIG. 6 illustrates a network topology of an example network system, in accordance with various embodiments.

FIG. 6 illustrates a network block diagram of an example network topology 600 according to various embodiments. Network 600 includes core network 601, subnetworks 603 and 605, and external network (or external autonomous system) 641. Core network 601 comprises iBGP router 611 and border BGP routers 613, 615, 617, and 619. In one embodiment, border BGP routers 613-619 are RTDBHF routers. In another embodiment, border BGP routers 613-619 are RTSBHF routers. It is to be understood that these embodiments are described by way of example and not to be understood as limiting. For example, in other configurations, border BGP routers 613-619 can be any combination of RTSBHF and RTDBHF routers.

Border BGP routers 613-619 are grouped into BGP communities 621 and 623. The first BGP community 621 comprises border BGP routers 613 and 615. Border BGP routers 613 and 615 are each coupled to first destination 631 in subnetwork 603. First destination 631 can be: one or more targeted address or host; one or more targeted network; or one or more router servicing the targeted host(s) or network(s). Border BGP routers 613 and 615 are only shown connecting to first destination 631, but it is to be understood that border BGP routers 613 and 615 can connect to and service multiple other destinations. The second BGP community 623 comprises border BGP routers 617 and 619. The border BGP router 617 is coupled directly to second destination 651 in subnetwork 605, whereas border BGP router 619 does not connect to second destination 651. Second destination 651 can be: one or more targeted address or host; one or more targeted network; or one or more router servicing the targeted host(s) or network(s). In one embodiment, the second destination 651 is an RTSBHF router servicing a targeted address. Each of the border BGP routers 613-619 and iBGP router 611 are directly connected to each other. In some embodiments, the border BGP routers 613-619 are network edge routers.

The iBGP router 611 is coupled to a network operations center (NOC) 625. The NOC 625 is one or more location from which the network 600 can be monitored or controlled. The NOC 625 can be, but is not limited to, a computer, or separate network. In some embodiments, the NOC 625 can be a customer/subscriber host unit configured with network management functionality. The NOC 625 is used to generate an iBGP advertisement, which is then forwarded by iBGP router 611 to border BGP routers 613-619 to update a routing table or FIB. For example, if a DoS is detected, whether by a customer/subscriber or the ISP, then the customer, subscriber, or ISP can remotely trigger, via NOC 625, combined destination and source address black hole filtering on the network 600. When combined BHFing is triggered, an iBGP advertisement is generated by iBGP router 611 to update the next hop address for the network traffic. The next hop address may be updated only for a single address of the host under attack, and/or for a network prefix associated with subnetworks 603 and 605. The iBGP advertisement also includes information to overwrite a next hop address to a source address/network of the attack traffic. Furthermore, the iBGP advertisement may announce a BGP community value assigned to each BGP community 621 and 623 such that only border BGP routers in the specific BGP community will update next hop address information according to the iBGP advertisement. The iBGP advertisement is also transmitted to black hole filtering devices 629 and 651.

Network traffic enters core network 601 from external network 641. External 641 may be another network within the same autonomous system or may be a separate autonomous system.

Border BGP routers 613 and 615 are coupled to sinkhole tunnel 627a. Sinkhole tunnel 627a is configured to tunnel network traffic from border BGP routers 613 and 615 to BHF device 629. In some embodiments, BHF device 629 is a RTSBHF router, and sinkhole tunnel 627a is an MPLS tunnel with VRF functionality. In other embodiments, BHF device 629 is a RTDBHF router. To be understood that BHF device 629 can be either a destination address or source address black hole filtering device, as long as the combined functionality of border BGP router 613 and BHF device 629 and/or border BGP router 615 and BHF device 629 provide both source and destination address black hole filtering. BHF device is also coupled back to core network 601. In some embodiments, the BHF device 629 can be configured to re-inject black hole filtered network traffic back into the core network 601 for routing through the core network 601 to the intended destination.

Border BGP router 617 is coupled to sinkhole tunnel 627b. Sinkhole tunnel 627b is configured to tunnel network traffic from border BGP router 617 to second destination 651. Although border BGP router 617 is shown only connecting to second destination 651, it is to be understood that border BGP router 617 can be configured to connect to multiple other destinations. Similarly, although border BGP router 619 is not shown as connecting to any destinations outside of core network 601, border BGP router can connect to multiple destinations, these connections are not shown in order to simplify the figure and aid in the understanding of the embodiments. In one embodiment, sinkhole tunnel 627b is an MPLS tunnel with VRF functionality. Second destination 651 is configured to be a BHF device, where the combined functionality of border BGP router 617 and second destination 651 provide both destination and source address black hole filtering.

For illustration, an example DoS attack on the network 600 of FIG. 6 will be described. In one embodiment, a DoS attack on first destination 631 will be handled by network 600 in the following manner. In this embodiment, border BGP routers 613 and 615 are RTDBHF routers, and BHF device 629 is an RTSBHF router. Network traffic is received from external network 641 by core network 601. When a DoS attack on first destination 631 is detected or a combined source and destination address BHF routine is triggered, an iBGP advertisement is created. The iBGP advertisement modifies the next hop address, for all traffic addressed to the address of first destination 631, to sinkhole tunnel 627a. The iBGP advertisement also modifies the next hop address for all traffic having a network prefix associated with subnetwork 603. The iBGP advertisement also indicates a BGP community value associated with first BGP community 621. Border BGP routers 613-619 receive the iBGP advertisement. Border BGP routers 617-619 disregard the iBGP advertisement, as the BGP community value of advertisement does not match that of second BGP community 623. RTDBHF routers 613-615, however, update their routing information to overwrite the next hop address for all traffic addressed to first destination 631. Thus, RTDBHF routers forward all traffic addressed to first destination 631 to sinkhole tunnel 627a. Sinkhole tunnel 627a carries the network traffic to RTSBHF router 629. RTSBHF router 629 is associated with BGP community 621, and thus updates next hop address information for all traffic originating from the attacking source address to a discard interface. Thus, RTSBHF router 629 filters all of the traffic directed to first destination address 631 originating from attacking source address, and forwards only traffic to first destination address 631 not originating from an attacking source address.

Although the embodiments above all contemplate the use of a remote triggered system, it is to be understood that other systems may not include remote triggering functionality and instead combined destination and source address black hole filtering can be triggered automatically by the system or in another non-remote manner.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that other embodiments cover all modifications and equivalents within the scope of the following claims.

What is claimed is:

1. A method, comprising:
   assigning each border router able to transmit attack traffic a respective unique border gateway protocol community value;
   advertising an advertised border gateway protocol community value;
   advertising a first modified next hop address for a destination address of network traffic;
   advertising a second modified next hop address for a source address of network traffic;
   overwriting, at one of a first router or second router, a first next hop address of the destination address with the first modified next hop address, wherein overwriting the first next hop address of the destination address comprises overwriting a set of next hop addresses for all network traffic having a network prefix of a subnetwork of the destination address with the first modified next hop address, wherein the first next hop address is overwritten only if the advertised border gateway protocol community value matches the unique border gateway protocol community value, and wherein the first next hop address is not overwritten if the advertised border gateway protocol community value does not match the unique border gateway protocol community value;
   overwriting, at the other of the first router or the second router, a second next hop address of the source address with the second modified next hop address, wherein the second next hop address is overwritten only if the advertised border gateway protocol community value matches the unique border gateway protocol community value, and wherein the second next hop address is not overwritten if the advertised border gateway protocol community value does not match the unique border gateway protocol community value;
   forwarding, with the first router, filtered traffic to one of the first modified next hop address or second modified next hop address, wherein the filtered traffic comprises only network traffic addressed to one of the destination address or from the source address;
   transporting the filtered traffic via a sinkhole tunnel to the second router;
   receiving, with the second router, the filtered traffic from the sinkhole tunnel;
   forwarding, with the second router, attack traffic to a discard interface, wherein attack traffic is filtered traffic that is both addressed to the destination address and from the source address.

2. The method of claim 1, further comprising:
   assigning border gateway protocol community value to a group of more than one border routers.

3. The method of claim 1, wherein the first modified next hop address is an address of a sinkhole tunnel, and the second modified next hop address is an address of a discard interface.

4. The method of claim 1, wherein the first modified next hop address is an address of a discard interface, and the second modified next hop address is an address of a sinkhole tunnel.

5. The method of claim 1, further comprising:
   reinjecting non-attack traffic into a core network associated with the destination address.

6. A remote triggered combined destination and source IP address black hole filtering apparatus comprising:

a remote triggered destination address black hole filter (RTDBHF) unit, wherein the RTDBHF unit has a first border gateway protocol community value to identify the RTDBHF unit, the RTDBHF unit comprising:
one or more processors;
a first route information listing, wherein the route information listing includes a routing table or forwarding information base;
a non-transitory computer readable medium containing machine-readable instructions, which, when read by the one or more processors, causes the one or more processors to:
receive a border gateway protocol community value from the advertisement;
receive an advertisement having a first modified next hop address for a destination address of network traffic;
overwrite a first next hop address of the destination address with the first modified next hop address in the first route information listing, wherein overwriting the first next hop address of the destination address comprises overwriting a set of next hop addresses for all network traffic having a network prefix of a subnetwork of the destination address with the first modified next hop address in the first route information listing, wherein the first next hop address is overwritten only if the advertised border gateway protocol community value matches the first border gateway protocol community value, and wherein the first next hop address is not overwritten if the advertised border gateway community value does not match the first border gateway protocol community value;
a remote triggered source address black hole filter (RTSBHF) unit, wherein the RTSBHF unit has a second border gateway protocol community value to identify the RTSBHF unit, the RTSBHF unit comprising:
one or more processors;
a second route information listing, wherein the second route information listing includes a routing table or forwarding information base;
a non-transitory computer readable medium containing machine-readable instructions, which, when read by the one or more processors, causes the one or more processors to:
receive a border gateway protocol community value from the advertisement;
receive an advertisement having a second modified next hop address for a source address of network traffic;
overwrite a second next hop address of the source address with the modified next hop address in the second route information listing, wherein the second next hop address is overwritten only if the advertised border gateway protocol community value matches the second border gateway protocol community value, and wherein the second next hop address is not overwritten if the advertised border gateway protocol community value does not match the second border gateway protocol community value,
wherein one of the remote triggered destination address black hole filter unit or the remote triggered source address black hole filter unit is configured to forward filtered traffic to one of the first modified next hop address or second modified next hop address, wherein the filtered traffic comprises only network traffic addressed to one of the destination address or from the source address,
wherein a sinkhole tunnel is configured to communicatively couple the remote triggered destination address black hole filter unit to the remote triggered source address black hole filter unit,
wherein one of the remote triggered destination address black hole filter unit or the remote triggered source address black hole filter unit is configured to transport the filtered traffic via the sinkhole,
wherein the other of the remote triggered destination address black hole filter unit or the remote triggered source address black hole filter unit is configured to receive the filtered traffic from the sinkhole, and
wherein the other of the remote triggered destination address black hole filter unit or the remote triggered source address black hole filter unit is configured to forward attack traffic to a discard interface, wherein attack traffic is filtered traffic that is both addressed to the destination address and from the source address.

7. The apparatus of claim 6, wherein the first modified next hop address is an address of a sinkhole tunnel, and the second modified next hop address is an address of a discard interface.

8. The apparatus of claim 6, wherein the first modified next hop address is an address of a discard interface, and the second modified next hop address is an address of a sinkhole tunnel.

9. The apparatus of claim 6, wherein the sinkhole tunnel comprises one or more Multi-Protocol Label Switching tunnels with Virtual Private Network routing and forwarding.

10. The apparatus of claim 6, wherein the sinkhole tunnel comprises one or more generic routing encapsulation ("GRE") network tunnels.

11. The apparatus of claim 6, wherein the remote triggered destination address black hole filter unit and the remote triggered source address black hole filter unit are part of a single router.

12. The apparatus of claim 6, wherein the remote triggered destination address black hole filter unit and remote triggered source address black hole filter unit are implemented in a single router.

13. A system for combined triggered destination and source IP address black hole filtering comprising:
a core network in communication with an external network, and a subnetwork, the core network comprising:
an internal border gateway protocol router, the internal border gateway protocol router comprising:
one or more first processors; and
a first non-transitory computer readable medium containing machine-readable instructions, which, when read by the one or more first processors, causes the internal border gateway protocol router to:
generate a customized internal border gateway protocol advertisement, wherein the advertisement includes a first modified next hop address for a destination address of network traffic, and a second modified next hop address for a source address of network traffic;
a first set of one or more remote triggered destination address black hole filtering (RTDBHF) routers, wherein each RTDBHF router has a respective first border gateway protocol community value to identify the particularly RTDBHF router, the RTDBHF router comprising:

one or more second processors; and a second non-transitory computer readable medium containing machine-readable instructions, which, when read by the one or more second processors, causes the first set of one or more RTDBHF routers to:

receive a border gateway protocol community value from the advertisement;

receive an advertisement having a first modified next hop address for a destination address of network traffic; and overwrite a first next hop address of the destination address with the first modified next hop address in a first route information listing, wherein the first route information listing includes a routing table or forwarding information base, wherein overwriting the first next hop address of the destination address comprises overwriting a set of next hop addresses for all network traffic having a network prefix of a subnetwork of the destination address with the first modified next hop address in the first route information listing, wherein the first next hop address is overwritten only if the advertised border gateway protocol community value matches each respective first border gateway protocol community value, and wherein the first next hop address is not overwritten if the advertised border gateway protocol community value does not match each respective first border gateway protocol community value;

a second set of one or more remote triggered source address black hole filtering (RTSBHF) routers, wherein each RTSBHF router has a respective second border gateway protocol community value to identify the particularly RTSBHF router, the RTSBHF router comprising:

one or more third processors; and a third non-transitory computer readable medium containing machine-readable instructions, which, when read by the one or more third processors, causes the second set of one or more RTSBHF routers to:

receive a border gateway protocol community value from the advertisement;

receive an advertisement having a second modified next hop address for a source of network traffic; and overwrite a second next hop address of the source address with the second modified next hop address in a second route information listing, wherein the second route information listing includes a routing table or forwarding information base, wherein the second next hop address is overwritten only if the advertised border gateway protocol community value matches each respective second border gateway protocol community value, and wherein the second next hop address is not overwritten if the advertised border gateway protocol community value does not match respective second border gateway protocol community values, wherein one of the first set of the one or more RTDBHF routers or the second set of the one or more RTSBHF routers is configured to forward filtered traffic to one of the first modified next hop address or second modified next hop address, wherein the filtered traffic comprises only network traffic addressed to one of the destination address or from the source address, wherein the sinkhole tunnel is configured to communicatively couple one or more RTDBHF routers of the first set to a respective one or more RTSBHF routers of the second set, wherein one of the first set of the one or more RTDBHF routers or the second set of the one or more RTSBHF routers is configured to transport the filtered traffic via the sinkhole, wherein the other of the first set of the one or more RTDBHF routers or the second set of the one or more RTSBHF routers is configured to receive the filtered traffic from the sinkhole, and wherein the other of the first set of the one or more RTDBHF routers or the second set of the one or more RTSBHF routers is configured to forward attack traffic to a discard interface, wherein attack traffic is filtered traffic that is both addressed to the destination address and from the source address.

14. The system of claim 13, wherein the first modified next hop address is an address of a sinkhole tunnel, and the second modified next hop address is an address of a discard interface.

15. The system of claim 13, wherein the first modified next hop address is an address of a discard interface, and the second modified next hop address is an address of a sinkhole tunnel.

* * * * *